United States Patent
Balsiger et al.

(10) Patent No.: US 12,179,911 B2
(45) Date of Patent: Dec. 31, 2024

(54) FAILSAFE ELECTRO-MECHANICAL ACTUATOR

(71) Applicant: Hamilton Sundstrand Corporation, Charlotte, NC (US)

(72) Inventors: Derick S. Balsiger, Prescott Valley, AZ (US); Keith A. Bloxham, Gilbert, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 226 days.

(21) Appl. No.: 17/987,366

(22) Filed: Nov. 15, 2022

(65) Prior Publication Data

US 2024/0158069 A1 May 16, 2024

(51) Int. Cl.
*B64C 13/34* (2006.01)
*B64C 13/50* (2006.01)
*F16D 27/108* (2006.01)
*F16D 27/14* (2006.01)
*F16H 49/00* (2006.01)

(52) U.S. Cl.
CPC ............ *B64C 13/50* (2013.01); *F16D 27/108* (2013.01); *F16D 27/14* (2013.01); *F16H 2049/003* (2013.01)

(58) Field of Classification Search
CPC ... B64C 13/343; B64C 13/341; B64C 13/506; B64C 13/503; F16H 2025/2071; F16H 2025/2068; F16D 27/108; F16D 27/14
See application file for complete search history.

(56) References Cited

U.S. PATENT DOCUMENTS

| | | | |
|---|---|---|---|
| 6,012,347 A | 1/2000 | Hasegawa | |
| 9,353,804 B2 | 5/2016 | Balsiger et al. | |
| 9,371,899 B2 | 6/2016 | Balsiger | |
| 9,493,230 B2 * | 11/2016 | Balsiger | F16H 37/04 |
| 2015/0184700 A1 | 7/2015 | Balsiger | |
| 2018/0038468 A1 | 2/2018 | Balsiger et al. | |

OTHER PUBLICATIONS

Extended European Search Report issued in European Application No. 23209866.6 dated Mar. 25, 2024; 7 pages.

* cited by examiner

*Primary Examiner* — Gregory Robert Weber
(74) *Attorney, Agent, or Firm* — CANTOR COLBURN LLP

(57) ABSTRACT

A failsafe electro-mechanical actuator, the actuator having: an output shaft having a first and second ends spaced apart from each other along a shaft axis, and outwardly facing helical grooves formed along the first end; a motor shaft surrounding the output shaft; a harmonic drive between the motor and output shafts that transfers motion between these shafts in a first mode of operation; ball bearings seated at the first end of the motor shaft and project inwardly from the motor shaft; in the first mode of operation: the ball bearings are disengaged from the output shaft and the output shaft rotates with the motor shaft, and in a second mode of operation, the motor shaft axially moves toward the first end of the output shaft; the motor shaft is rotationally fixed; and the ball bearings engage the helical grooves in the output shaft, whereby the output shaft rotates.

20 Claims, 8 Drawing Sheets

FAILSAFE ELECTRO-MECHANICAL ACTUATOR

BACKGROUND

The embodiments herein relate to actuators and, more particularly, to a failsafe electro-mechanical actuator.

Aircraft typically include electro-mechanical actuators to operate flight control surfaces and other surfaces such as stator vanes within engines. These surfaces are typically flight critical, in that following a failure they need to be moved or allowed to move to a safe position to allow for continued safe flight and landing. In many cases the actuator cannot rely on air loads and needs to move in a controlled manner under its own power. In the case of engine stator vane control, the system needs to fail to a position that allows air to continue to flow through the engine without restriction.

BRIEF DESCRIPTION

Disclosed is a failsafe electro-mechanical actuator for moving a component within an aircraft, the actuator including: an output shaft having a first end and a second end spaced apart from each other along a shaft axis, wherein the second end couples with the component, and outwardly facing helical grooves formed along the first end; and a motor shaft surrounding the output shaft; a harmonic drive between the motor shaft and the output shaft that transfers motion from the motor shaft to the output shaft in a first mode of operation; ball bearings seated at the first end of the motor shaft such that the ball bearings project inwardly from the motor shaft; wherein, in the first mode of operation: the ball bearings are disengaged from the output shaft so that the output shaft rotates with the motor shaft, and in a second mode of operation, the motor shaft axially moves toward the first end of the output shaft; the motor shaft is rotationally fixed; and the ball bearings engage the helical grooves in the output shaft, whereby the output shaft rotates.

In addition to one or more aspects of the actuator, or as an alternate, the motor shaft has a first end and a second end spaced apart from each other along the shaft axis, wherein the first end of the output shaft extends past the first end of the motor shaft and the second end of the output shaft extends past the second end of the motor shaft.

In addition to one or more aspects of the actuator, or as an alternate, the output shaft includes an intermediate section between the first end and the second end of the output shaft; the motor shaft has an intermediate section between the first end and the second end of the motor shaft, the harmonic drive includes: an inwardly facing wave generator profile formed onto a first portion of the intermediate section of the motor shaft, bearings disposed against the wave generator profile that are axially fixed against the motor shaft; an outwardly facing circular spline disposed on a first portion of the output shaft; and a flex spline disposed against the circular spline that is axially fixed against the output shaft, wherein in the first mode, the first portion of the motor and output shafts are axially aligned with each other, and in the second mode, the first portion of the motor and output shafts are axially offset from each other.

In addition to one or more aspects of the actuator, or as an alternate, in the second mode, the motor shaft moves axially by a predetermined distance, and the first portions of the output shaft and the motor shaft are axially shorter than the predetermined distance.

In addition to one or more aspects of the actuator, or as an alternate, along the output shaft: the first end has a first outer diameter; the second end has a second outer diameter; and the intermediate section has a third outer diameter, wherein the first outer diameter is larger than the second and third outer diameters, and whereby a radial gap is defined between the motor shaft and the intermediate section of the output shaft, and the harmonic drive is sized to fit within the radial gap.

In addition to one or more aspects of the actuator, or as an alternate, the actuator includes the motor shaft has outwardly facing rotor magnets located at the first portion of the motor shaft.

In addition to one or more aspects of the actuator, or as an alternate, the actuator includes a solenoid that surrounds, and is axially aligned with, the first end of the output shaft, wherein the solenoid is rotationally fixed, and in the second mode, the solenoid is activated to move the motor shaft toward the first end of the output shaft.

In addition to one or more aspects of the actuator, or as an alternate, the first end of the motor shaft has radially outwardly facing projections; and the solenoid defines an inner surface formed with axially extending grooves, and in the second mode, the projections move into the grooves to rotationally fix the motor shaft.

In addition to one or more aspects of the actuator, or as an alternate, the actuator includes a support platform surrounding the output shaft and being located near the second end of the output shaft, wherein when the second end of the motor shaft is positioned adjacent to the support platform, the first portions of the motor and output shafts are axially aligned.

In addition to one or more aspects of the actuator, or as an alternate, the actuator includes a flex spline shaft that extends from a first end to a second end, wherein the second end defines the support platform, and the first end is located intermediate the flex spline and the first end of the motor shaft, and wherein the flex spline is defined at a first portion of the flex spline shaft.

In addition to one or more aspects of the actuator, or as an alternate, the actuator includes a retainer plate located at the first end of the output shaft; a coil spring disposed between the retainer plate and the motor shaft, to urge the motor shaft toward the support platform.

In addition to one or more aspects of the actuator, or as an alternate, the first end of the output shaft includes axially extending bosses and the retainer plate includes axially extending rotation limiter projections, and in the second mode, the bosses engage the projections to limit rotation of the output shaft.

In addition to one or more aspects of the actuator, or as an alternate, the actuator includes a first thrust bearing axially between the coil spring and the motor shaft.

In addition to one or more aspects of the actuator, or as an alternate, the actuator includes a second thrust bearing axially between the motor shaft and the support platform.

In addition to one or more aspects of the actuator, or as an alternate, the actuator includes a housing that surrounds the motor shaft, the solenoid, the support platform and to which the retainer plate is secured.

In addition to one or more aspects of the actuator, or as an alternate, the actuator includes roller bearings disposed within the housing, the roller bearings supporting the motor shaft, the roller bearings being located: axially between the first portion of the motor shaft and the first end of the motor shaft; and axially between the first portion of the motor shaft and the second end of the motor shaft.

In addition to one or more aspects of the actuator, or as an alternate, the actuator includes lower ball bearings disposed within the housing, wherein the lower ball bearings support the output shaft and are located axially between the support platform and the second end of the output shaft.

In addition to one or more aspects of the actuator, or as an alternate, the actuator includes stator windings supported in the housing, wherein the stator windings are positioned such that the stator windings are axially aligned with the rotor magnets when the first portions of the motor shaft and the output shaft are axially aligned.

Further disclosed is an aircraft including a rotatable component; and an actuator having one or more of the above disclosed aspects connected to the component and configured to rotate the component.

In addition to one or more aspects of the aircraft, or as an alternate, the component is a control surface or a stator vane within an engine of the aircraft.

DETAILED DESCRIPTION

Figure 1:
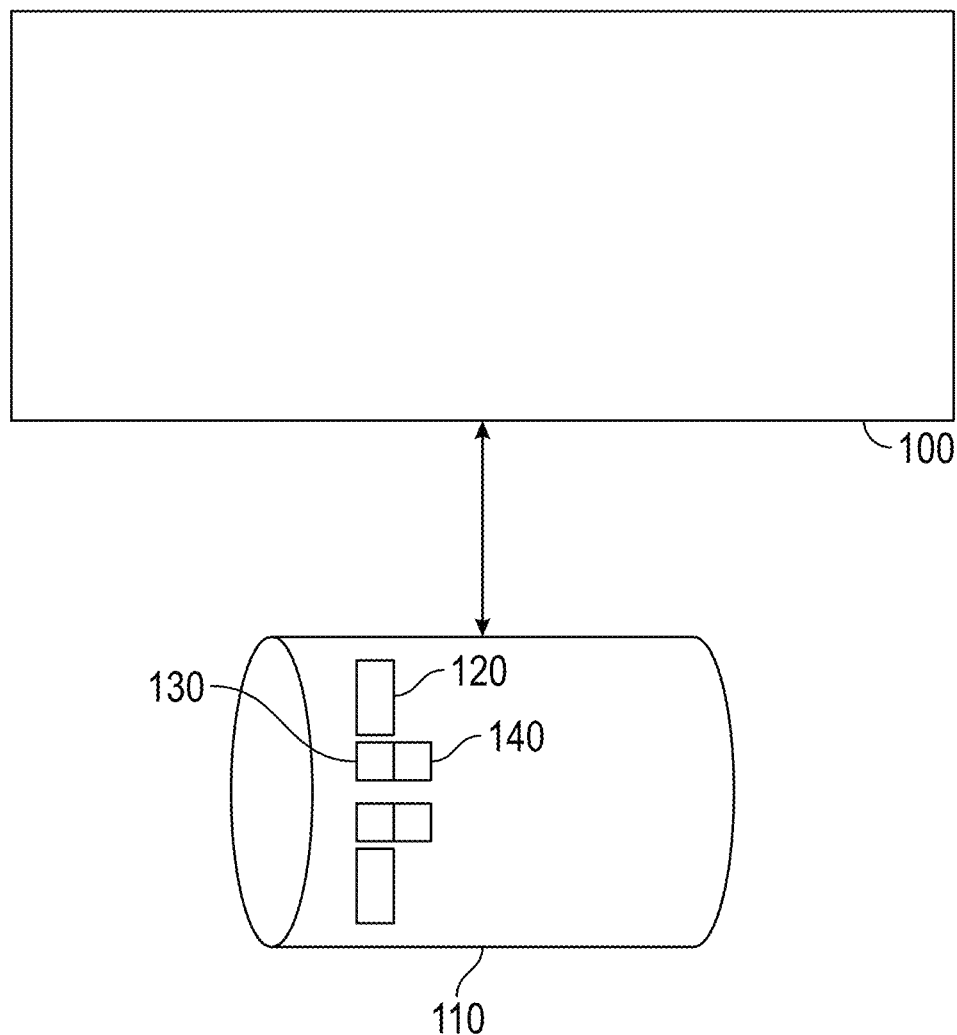
FIG. 1 is a schematic illustration of an aircraft with an engine, and a component such as a vane connected to the engine with a failsafe actuator (for simplicity, an actuator) that controls its position, according to an embodiment.

Turning to FIG. 1, an aircraft 100 may have an engine 110 with a movable component 120 such as a blade or vane. An actuator 130 may control the angulation of the component 120. The actuator 130 is controlled by a motor controller, motor 140, and reduction gearing. According to the embodiments, the actuator 130 is a failsafe electro-mechanical actuator. That is, should the motor controller, motor 140, or reduction gearing fail in flight, the actuator 130 rotates the component 120 to a predetermined position so that flight may continue without disruption.

Figure 2:
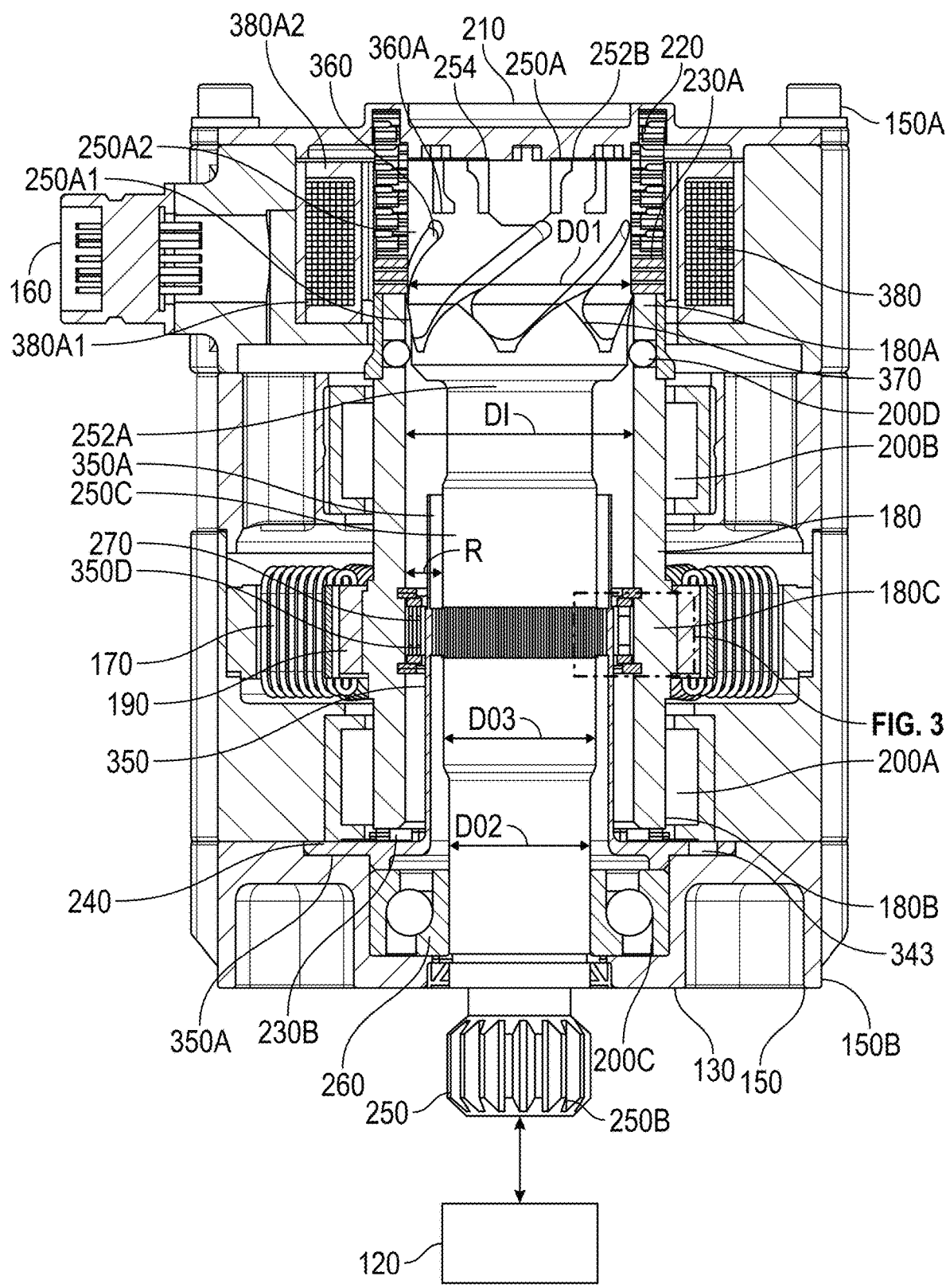
FIG. 2 shows aspects of the actuator of FIG. 1.

With reference to FIG. 2, the actuator 130 may include a housing 150 that extends from a first end 150A to a second end 150B. An electrical connector 160 is located at the first end 150A to provide power to, for example, stator coils 170 fixedly supported within the housing 150.

A motor shaft 180, supported to rotate within the housing 150, extends from a first end 180A to a second end 180B and has an intermediate section 180C therebetween. The motor shaft 180 is oriented so that its first end 180A is near the first end 150A of the housing 150 and its second end 180B is near the second end 150B of the housing 150. The motor shaft 180 has outwardly facing rotor magnets 190, disposed about the intermediate section 180C and which, together with the stator coils 170, forms the motor 140. In operation, application of a current to the stator coils 170 results in rotation of the motor shaft 180 due to interaction of the fields created by the current in the stator coils 170 and the rotor magnets 190.

Roller bearings 200A, 200B are provided in the housing 150 to support the motor shaft 180. As illustrated, the roller bearings 200A, 200B are arranged, near the first end 180A of the motor shaft 180 and the second end 180B of the motor shaft 180, to enable its rotation within the housing 150. The motor shaft 180 may move axially within the housing 150 against the roller bearings 200A, 200B.

A retainer plate 210 is supported at the first end 150A of the housing 150. A coil spring 220 extends from the retainer plate 210 to the first end 180A of the motor shaft 180 with a first thrust bearing 230A therebetween. The coil spring 220 urges the motor shaft 180 axially toward the second end 150B of the housing 150. A support platform 240 is fixed within the housing 150, near the second end 150B of the housing 150, and axially supports the motor shaft 180 at that end of the housing 150 during a first mode of operation of the actuator 130 (discussed below). A second thrust bearing 230B arranged is between the second end 180B of the motor shaft 180 and the support platform 240. Ball bearings (or lower ball bearings) 200C are between the support platform 240 and the second end 150C of the housing 150.

An output shaft 250 is rotationally supported within the housing 150 and is surrounded by the motor shaft 180 at least partly along its length. The output shaft 250 has a first end 250A (or head) and a second end 250B (or output end) and an intermediate section 250C therebetween. The motor shaft 180 is shorter than the output shaft 250. As shown, the motor shaft 180 is arranged around the output shaft 250 so the first end 250A of the output shaft 250 extends past the first end 180A of the motor shaft 180 and the second end 250B of the output shaft 250 extends past the second end 180B of the motor shaft 180. The first end 250A of the output shaft 250 is within the housing 150 and near the first end 150A of the housing 150, such that the retainer plate 210 is at the first end 250A of the output shaft 250. The second end 250B of the output shaft 250 extends out of the second end 150B of the housing 150 to connect with the movable component 120. The support platform 240 surrounds the output shaft 250 and is located near the second end 250B of the output shaft 250. A retainer clip 260 and ball bearings 200C are located near the second end 250B of the output shaft 250 at the second end 150B of the housing 150.

The first end 250A of the output shaft 250 has a first outer diameter DO1. The second end 250B of the output shaft 250 has a second outer diameter DO2. The intermediate section 250C of the output shaft 250 has a third outer diameter DO3. The first outer diameter DO1 is larger than the second and third outer diameters DO2, DO3. The motor shaft 180 has an inner diameter DI that is sized for a slip fit against the first end 250A of the output shaft 250. A radial gap R is defined between the motor shaft 180 and the intermediate section 250C of the output shaft 250. A harmonic drive 270 is sized to fit within the radial gap R.

Figure 3:
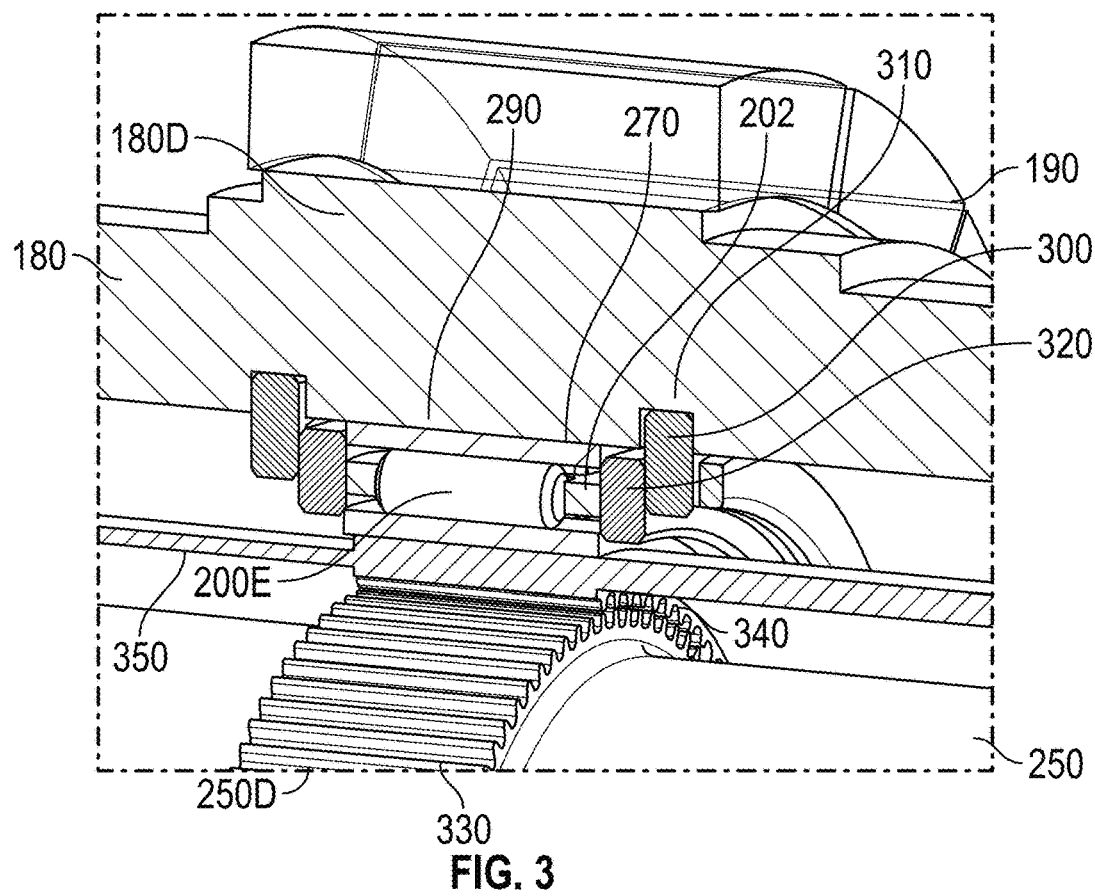
FIG. 3 shows a harmonic drive of the actuator, in which wave generator bearings are axially aligned with a flex spline.

As shown in FIG. 3, a first portion 180D of the intermediate section 180C of motor shaft 180 and a first portion 250D of the intermediate section 250C of the output shaft 250 are shown. The rotor magnets 190 are located at the first portion 180D of the motor shaft 180. An inwardly facing wave generator profile (or shape) 290 is formed onto the motor shaft 180 at least along its first portion 180D. That is, the wave generator profile 290 is cut directly into the inner surface of the motor shaft 180 in the region shown between grooves 310 formed in the motor shaft 180 on either side of the wave generator profile. As a result, the motor shaft 180 may be considered a wave generator.

Bearings 200E are disposed against the first portion 180D of the motor shaft 180. There is a bearing race on the inner wave generator shape, wave generator bearings 290 inside the bearing race and another bearing race inside the bearings. The bearings 200E are surrounded axially within a bearing cage 202. The bearings 200E are secured to the motor shaft 180, e.g., bearing retainer rings 300 are secured to the grooves 310 that are formed in the motor shaft 180. A thrust washer 320 holds the bearings in place axially. An outwardly facing circular spline 330 is disposed on a first portion 250D of the output shaft 250. A flex spline 340 is disposed against the circular spline 330 and is acted upon by the wave generator profile 290 via the bearings 200E. The groves 310 in the motor shaft and the rings 300, hold the wave generator bearing components axially to the motor shaft. When the motor shaft is pulled towards the first end 150A, the grooves and retaining rings force the wave generator bearings to move with the motor shaft.

As shown in FIG. 2, the flex spline 340 may be formed onto a first portion 350D of a flex spline shaft 350 that extends from a first end 350A to a second end 350B. The second end 350B of the flex spline shaft 350 forms the support platform 240 (FIG. 2) and the first end 350A of the flex spline shaft 350 is located between the flex spline 340 and the first end 250A of the output shaft 250. Thus, the flex spline 340 is axially fixed within the housing 150 and relative to the output shaft 250.

The support platform 240 also is mechanically fixed to the housing 150 with fasteners and or pins. A pin hole 343 for receiving a pin is shown on FIG. 2. This configuration fixes the flex-spline rotationally to the housing 150. With the housing being fixed to ground, this grounds the flex spline to react rotational torques.

Figure 4:
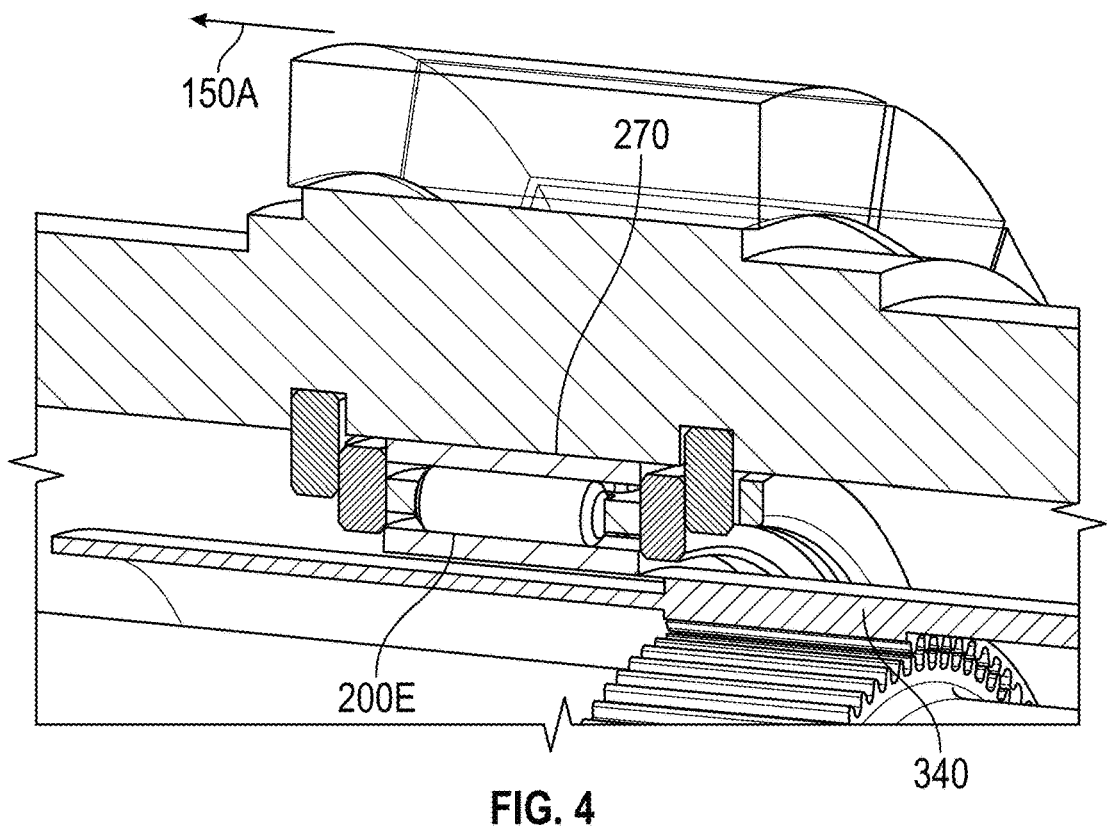
FIG. 4 shows the harmonic drive, in which the wave generator bearings are axially offset from the flex spline.

As shown in FIG. 3, when the second end 180B of the motor shaft 180 is located adjacent to the support platform 240, i.e., against the second thrust bearing 230B, the first portions 180D, 250D of the motor shaft 180 and output shaft 250 are axially aligned and the harmonic drive 270 transfers rotational energy from the motor shaft 180 to the output shaft 250. As shown in FIG. 4, when the motor shaft 180 moves toward the first end 150A of the housing 150, the first portions 180D, 250D of the motor shaft 180 and output shaft 250 are axially space apart and the harmonic drive 270 does not transfer rotational energy from the motor shaft 180 to the output shaft 250.

The first portions 250D, 180D of the output shaft 250 and motor shaft 180 are axially shorter than and an axial range of motion for the motor shaft 180 in a second mode of operation (discussed below). With this configuration, the harmonic drive 270 is disengaged when the motor shaft 180 moves axially as the actuator 130 changes operational modes.

Turning back to FIG. 2, the first end 250A of the output shaft 250 extends from a first end 252A, located at the intermediate section 250C of the output shaft 250, and a second end 252B, located at an axial outer surface 254 of the output shaft 250. Between the axial ends 252A, 252B of the first end 250A, the first end 250A has an axial outer portion 250A1 and an axial inner portion 250A2. The outer portion 250A1 has outwardly facing helical grooves 360 and the inner portion 250A2 has lead-in grooves 370 that are continuous with the helical grooves 360. The helical grooves 360 extend from the lead-in grooves 370 to helical groove ends 360A that are spaced apart from the axial outer surface 254 of the output shaft 250. That is, the helical grooves 360 do not reach the axial outer surface 254 of the output shaft 250. The inner portion 250A2 tapers radially inwardly. Ball bearings 200D are embedded in the motor shaft 180, near the first end 180A of the motor shaft 180, so that when the second end 180B of the motor shaft 180 is adjacent to the support platform 240, i.e., against the second thrust bearing 230B, the ball bearings 200D are axially aligned with the inner portion 250A2 of the first end 250A of the output shaft 250 and do not engage the output shaft 250. The ball bearings 200D engage the groves in the output shaft 250 when the motor shaft 180 moves toward the first end 150A of the housing 150.

Figure 5:
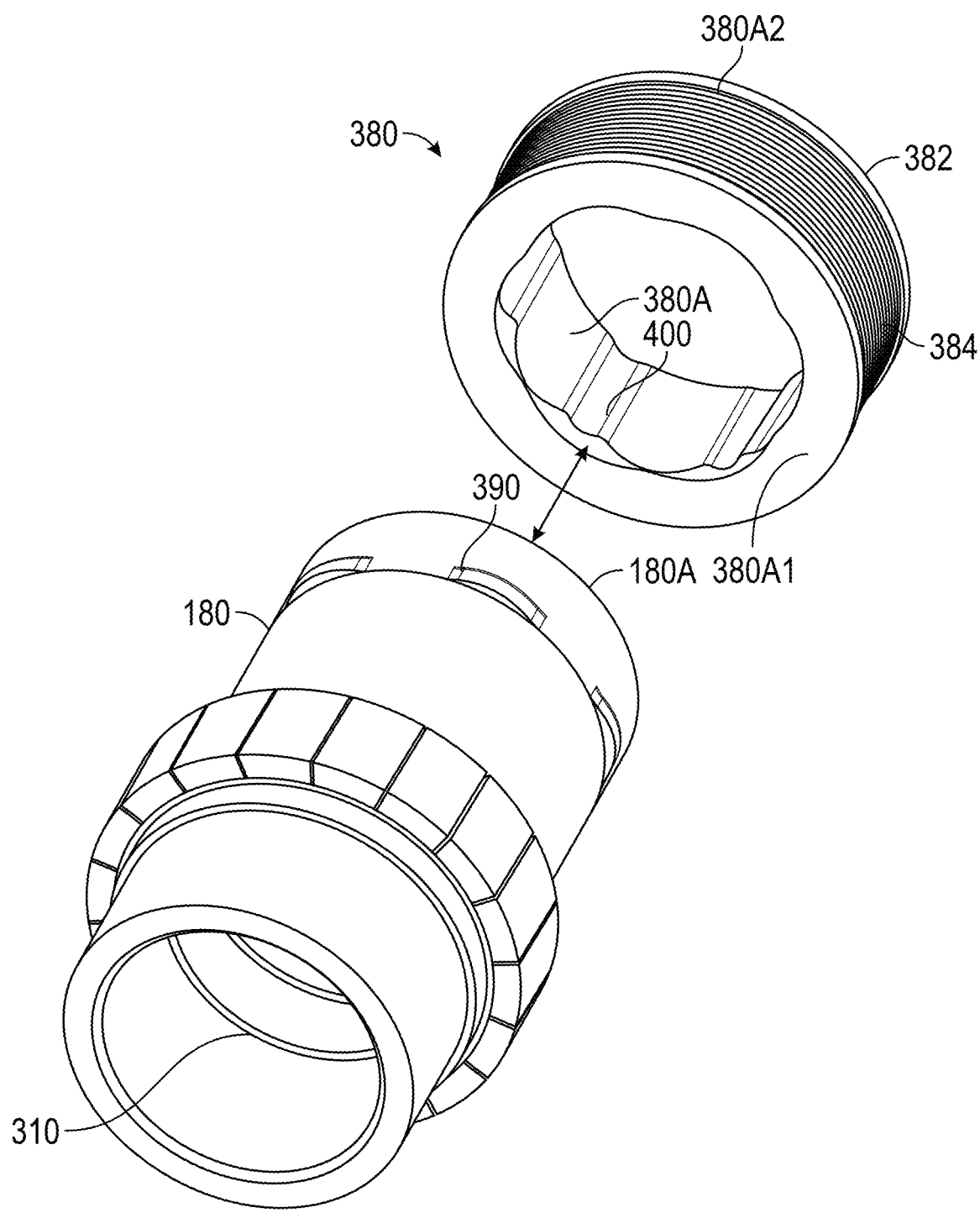
FIG. 5 shows a motor shaft and a solenoid of the actuator.

A solenoid 380 surrounds, and is axially aligned with, the first end 250A of the output shaft 250. The solenoid 380 is axially and rotationally fixed in the housing 150. As shown in FIG. 5, the solenoid 380 has a frame or shell 382 with coil windings 384 wrapped around the solenoid shell 382. The solenoid shell 382 defines an inner surface, or shaft 380A, formed with axially extending grooves 400. The solenoid 380 extends from a first end 380A1, that is axially aligned with an intersection between the lead-in grooves 370 and the helical grooves 360 of the output shaft 250, to a second end 380A2, that is at or near the axial outer surface 254 of the output shaft 250. That is, the solenoid 380 extends closer to the axial outer surface 254 of the output shaft 250 than the helical groove ends 360A.

In the second mode of operation (discussed below), application of a current to the solenoid coils 384 rather than the motor coils 170 results in drawing of the motor shaft 180 into the solenoid shaft 380A due to interaction of the fields created by the current in the solenoid coils 384 and the ferromagnetic material of the motor shaft 190. The first end 180A of the motor shaft 180 has radially outwardly projections 390. When the first end 180A of the motor shaft 180 moves axially into the solenoid shaft 380A, the projections 390 move into the grooves 400 to rotationally fix the motor shaft 180 relative to the solenoid 380.

The axial extension of the flex spline 340 towards first end 150A is such that when the second mode is established, the wave generator bearing 200E remains within (e.g., is constrained from leaving) the bore of the flex spline 340 but is spaced apart (e.g., not over) the splined portion of the flex spline 340. This configuration keeps the bearing 200E captured along the motor shaft.

Figure 6B:
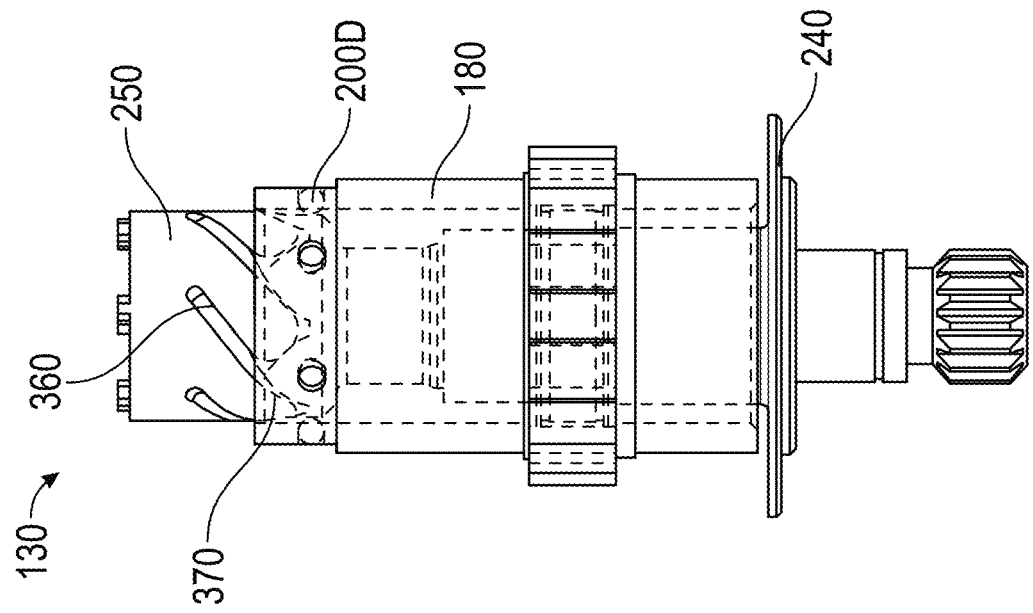
FIG. 6B shows the actuator in the first mode of operation, where the housing is not shown for clarity.
Figure 6A:
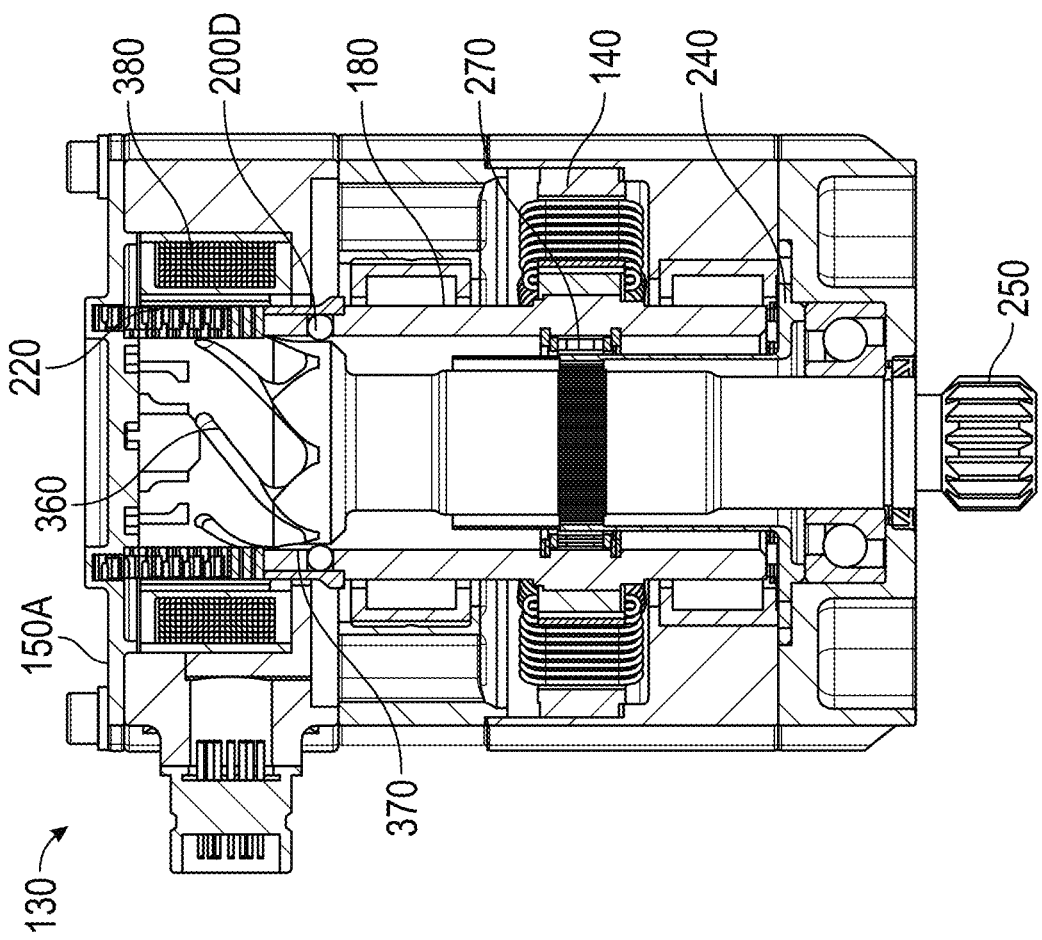
FIG. 6A shows the actuator in a housing in a first mode of operation.

Turning to FIGS. 6-8, the actuator 130 has two modes of operation, including the first or normal mode, and the second or failsafe mode. The second mode occurs when the motor 140 fails to act as expected. During the first mode (FIGS. 6A-6B), the solenoid 380 is not powered, the motor shaft 180 is adjacent to the support platform 240, and the harmonic drive 270 is engaged. During this mode, the ball bearings 200D that are embedded in the motor shaft 180 do not engage the output shaft 250

Figure 7B:
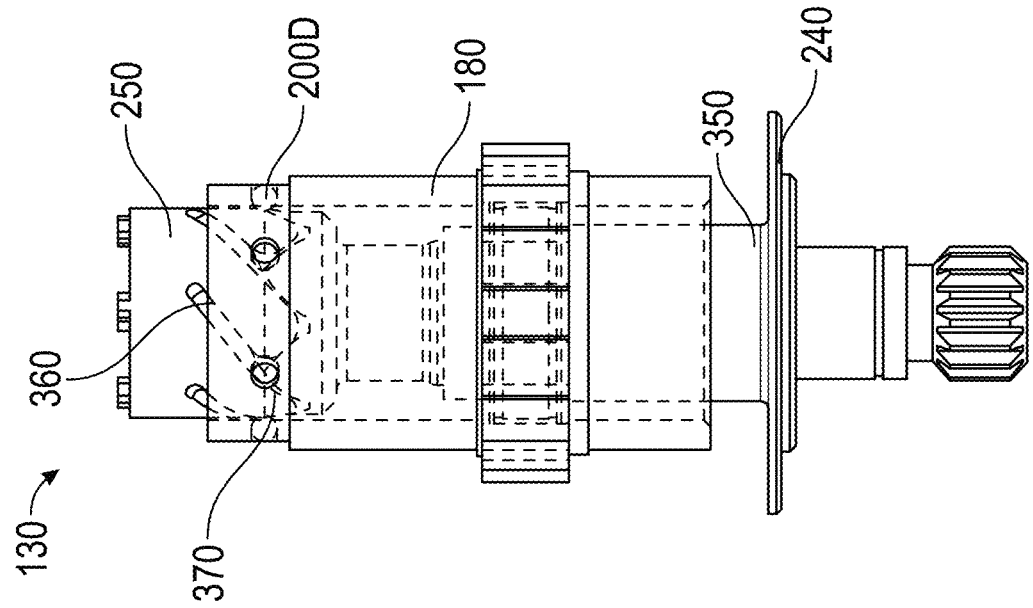
FIG. 7B shows the actuator transitioning to the second mode of operation, where the housing is not shown for clarity.
Figure 7A:
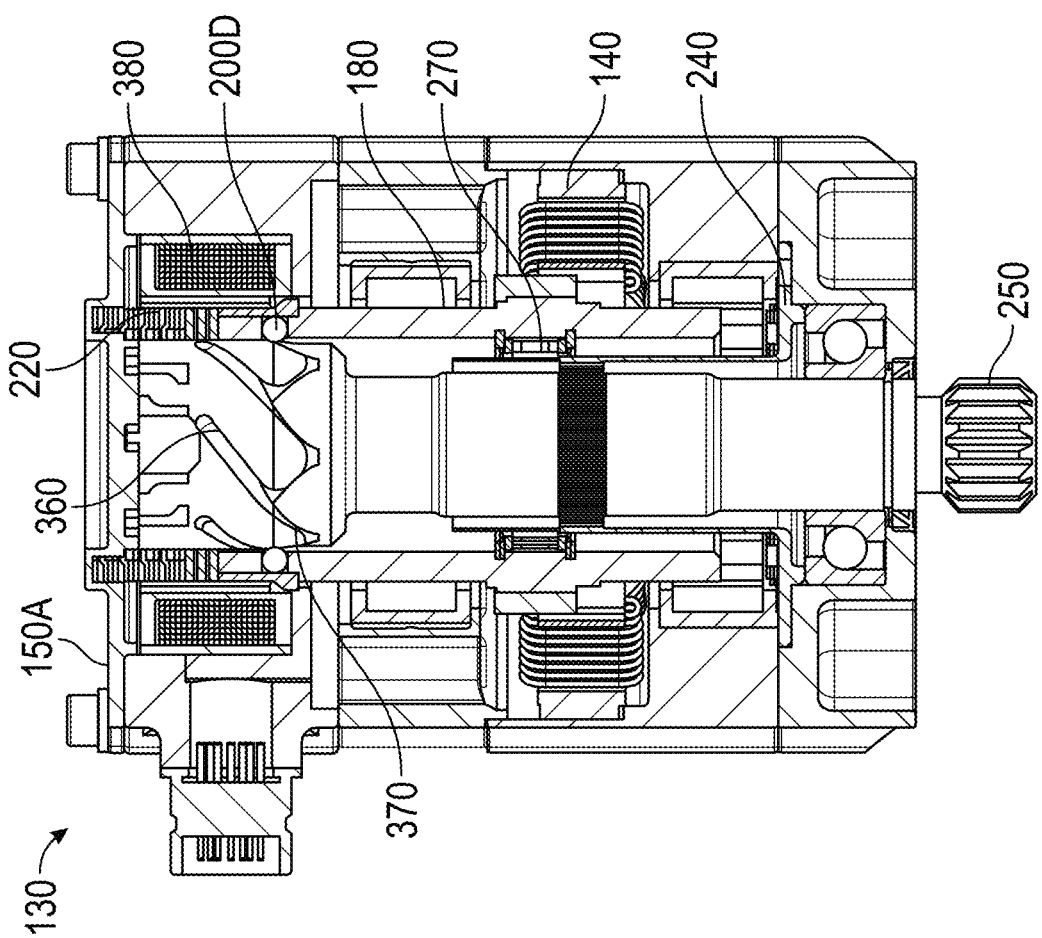
FIG. 7A shows the actuator in the housing as the actuator transitions to a second mode of operation.
Figure 8B:
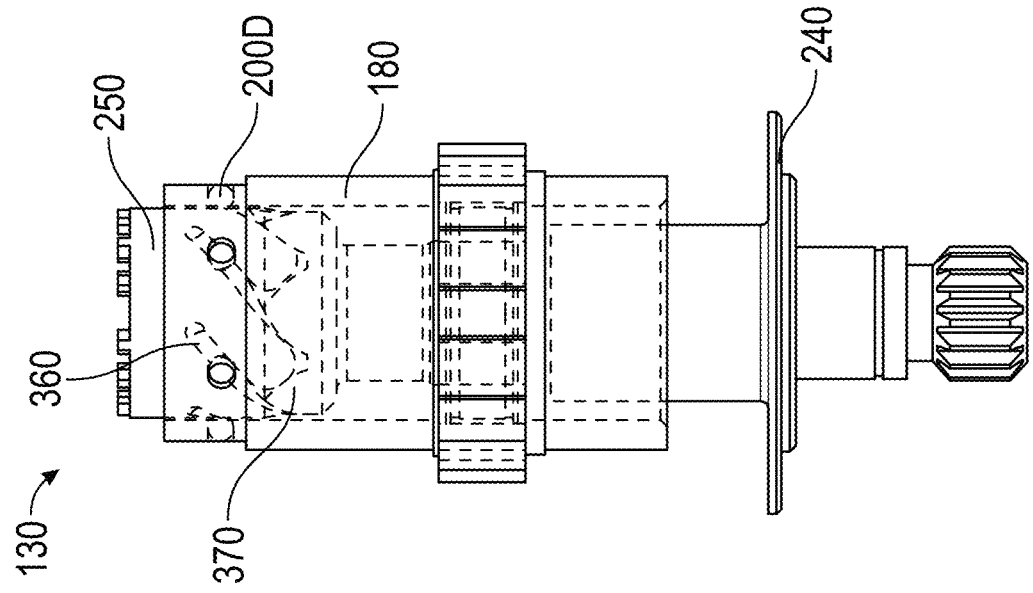
FIG. 8B shows the actuator in the second mode of operation, where the housing is not shown for clarity.
Figure 8A:
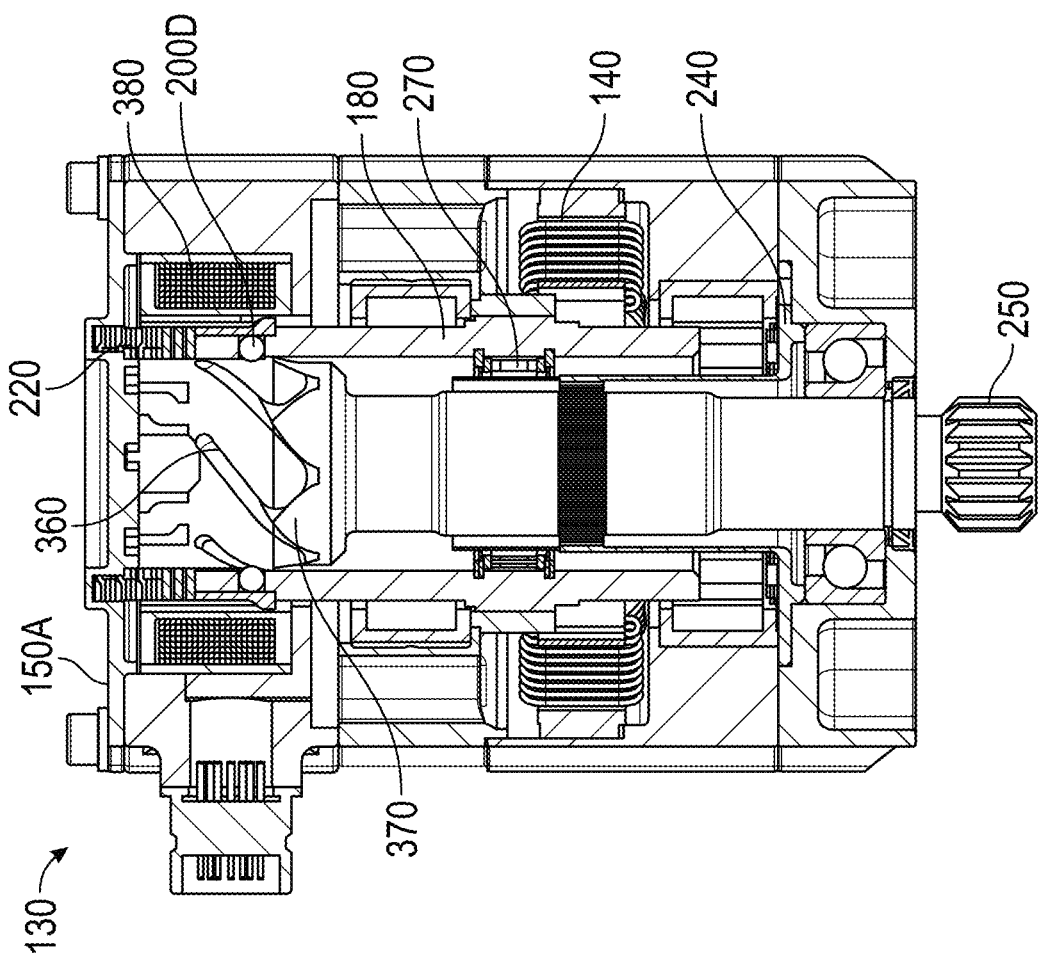
FIG. 8A shows the actuator in the housing in the second mode of operation.

During the second mode of operation, the solenoid 380 is powered. The motor shaft 180 is initially drawn toward the first end 150A of the housing 150, as the electromagnetic force generated by the solenoid 380 (discussed above) overpowers the spring force from the spring 220 and enters the solenoid 380 (FIGS. 7A-7B). At this time, the harmonic drive 270 is disengaged, the motor shaft 180 is prevented from rotation in the housing 150, and the ball bearings 200D that are embedded in the motor shaft 180 engage the lead-in grooves 370 and are guided toward the helical grooves 360 in the output shaft 250. As the second mode continues (FIGS. 8A-8B), the output shaft 250 turns due to advancement of the ball bearings 200D that are embedded in the motor shaft 180 within the helical grooves 360. During this time, the movable component 120 is pivoted to the failsafe position. As the helical grooves 360 do not reach the axial outer surface 254 of the output shaft 250, the ball bearings 200D are unable to roll out of the first end 250A of the output shaft 250.

Figure 9:
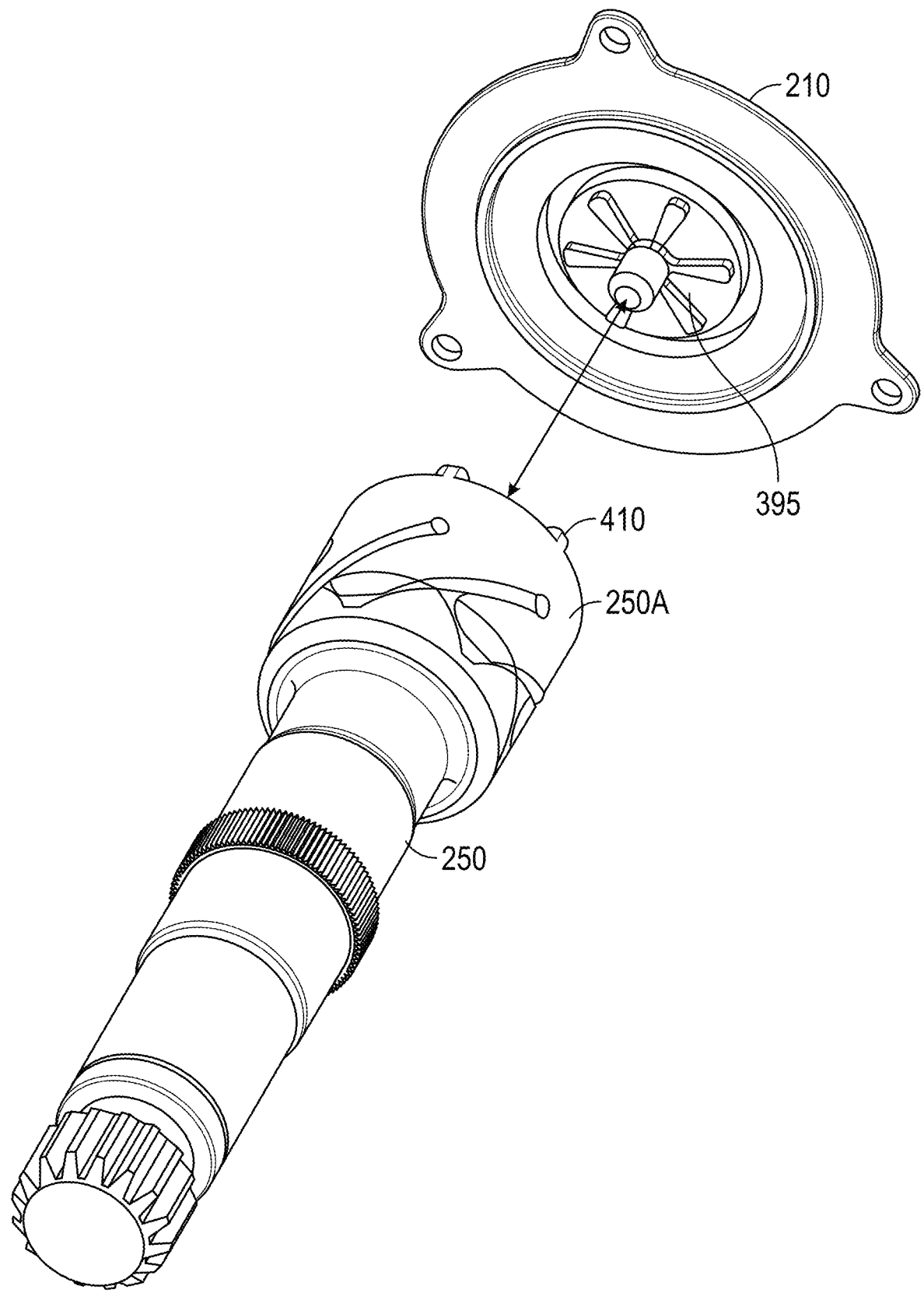
FIG. 9 shows an output shaft and retainer plate of the actuator.

Turning to FIG. 9, the first end 250A of the output shaft 250 includes axially extending bosses 410 and the retainer plate 210 includes axially extending rotation limiter projections (or plate bosses) 395. During the second mode of operation, the bosses 410 engage the plate bosses 395 to limit rotation of the output shaft 250 while the ball bearings 200D are moving toward the outer ends 360A of the helical grooves 360. This limits rotation of the movable component 120. That is, the bosses 410, 395 on the output shaft 250 and the retainer plate 210 are constrained by the disclosed configuration from moving axially relative to each other. However the output shaft bosses 410 rotate normally withing the plate bosses 395 on the retainer plate and, at failure, the balls, helical grooves combination force the output shaft bosses 410 against the retainer plate bosses 395 and the rotation stops when they are forced together Accordingly, the disclosed embodiments provides a system and method of independently isolating a failure and moving the actuator output to an end of stroke position, holding the actuator in that position.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A failsafe electro-mechanical actuator for moving a component within an aircraft, the actuator comprising:
    an output shaft having a first end and a second end spaced apart from each other along a shaft axis, wherein the second end couples with the component, and outwardly facing helical grooves formed along the first end; and
    a motor shaft surrounding the output shaft;
    a harmonic drive between the motor shaft and the output shaft that transfers motion from the motor shaft to the output shaft in a first mode of operation;
    ball bearings seated at the first end of the motor shaft such that the ball bearings project inwardly from the motor shaft;
    wherein,
    in the first mode of operation: the ball bearings are disengaged from the output shaft so that the output shaft rotates with the motor shaft, and
    in a second mode of operation, the motor shaft axially moves toward the first end of the output shaft; the motor shaft is rotationally fixed; and the ball bearings engage the helical grooves in the output shaft, whereby the output shaft rotates.

2. The actuator of claim 1, wherein:
    the motor shaft has a first end and a second end spaced apart from each other along the shaft axis, wherein the first end of the output shaft extends past the first end of the motor shaft and the second end of the output shaft extends past the second end of the motor shaft.

3. The actuator of claim 2, wherein:
    the output shaft includes an intermediate section between the first end and the second end of the output shaft;
    the motor shaft has an intermediate section between the first end and the second end of the motor shaft,
    the harmonic drive includes:
        an inwardly facing wave generator profile formed onto a first portion of the intermediate section of the motor shaft,
        bearings disposed against the wave generator profile that are axially fixed against the motor shaft;
        an outwardly facing circular spline disposed on a first portion of the output shaft; and
        a flex spline disposed against the circular spline that is axially fixed against the output shaft,
    wherein
    in the first mode, the first portion of the motor and output shafts are axially aligned with each other, and
    in the second mode, the first portion of the motor and output shafts are axially offset from each other.

4. The actuator of claim 3, wherein:
    in the second mode, the motor shaft moves axially by a predetermined distance, and the first portions of the output shaft and the motor shaft are axially shorter than the predetermined distance.

5. The actuator of claim 4, wherein:
    along the output shaft: the first end has a first outer diameter; the second end has a second outer diameter; and the intermediate section has a third outer diameter, wherein the first outer diameter is larger than the second and third outer diameters, and
    whereby a radial gap is defined between the motor shaft and the intermediate section of the output shaft, and the harmonic drive is sized to fit within the radial gap.

6. The actuator of claim 4, further comprising:
    the motor shaft has outwardly facing rotor magnets located at the first portion of the motor shaft.

7. The actuator of claim 6, further comprising:
    a solenoid that surrounds, and is axially aligned with, the first end of the output shaft,
    wherein the solenoid is rotationally fixed, and in the second mode, the solenoid is activated to move the motor shaft toward the first end of the output shaft.

8. The actuator of claim 7, wherein the first end of the motor shaft has radially outwardly facing projections; and the solenoid defines an inner surface formed with axially extending grooves, and in the second mode, the projections move into the grooves to rotationally fix the motor shaft.

9. The actuator of claim 8, further comprising:
a support platform surrounding the output shaft and being located near the second end of the output shaft,
wherein when the second end of the motor shaft is positioned adjacent to the support platform, the first portions of the motor and output shafts are axially aligned.

10. The actuator of claim 9, further comprising:
a flex spline shaft that extends from a first end to a second end, wherein the second end defines the support platform, and the first end is located intermediate the flex spline and the first end of the motor shaft, and wherein the flex spline is defined at a first portion of the flex spline shaft.

11. The actuator of claim 9, including:
a retainer plate located at the first end of the output shaft;
a coil spring disposed between the retainer plate and the motor shaft, to urge the motor shaft toward the support platform.

12. The actuator of claim 11, wherein:
the first end of the output shaft includes axially extending bosses and the retainer plate includes axially extending rotation limiter projections, and
in the second mode, the bosses engage the projections to limit rotation of the output shaft.

13. The actuator of claim 11, further comprising:
a first thrust bearing axially between the coil spring and the motor shaft.

14. The actuator of claim 11, further comprising:
a second thrust bearing axially between the motor shaft and the support platform.

15. The actuator of claim 11, further comprising:
a housing that surrounds the motor shaft, the solenoid, the support platform and to which the retainer plate is secured.

16. The actuator of claim 15, further comprising:
roller bearings disposed within the housing, the roller bearings supporting the motor shaft, the roller bearings being located:
axially between the first portion of the motor shaft and the first end of the motor shaft; and
axially between the first portion of the motor shaft and the second end of the motor shaft.

17. The actuator of claim 13, further comprising:
lower ball bearings disposed within the housing, wherein the lower ball bearings support the output shaft and are located axially between the support platform and the second end of the output shaft.

18. The actuator of claim 13, further comprising:
stator windings supported in the housing,
wherein the stator windings are positioned such that the stator windings are axially aligned with the rotor magnets when the first portions of the motor shaft and the output shaft are axially aligned.

19. An aircraft further comprising:
a rotatable component; and
the actuator of claim 1 connected to the component and configured to rotate the component.

20. The aircraft of claim 19, wherein the component is a control surface or a stator vane within an engine of the aircraft.

* * * * *